(12) United States Patent
Gurumurthy et al.

(10) Patent No.: US 9,864,804 B2
(45) Date of Patent: Jan. 9, 2018

(54) SEARCH ENGINE RECENCY USING CONTENT PREVIEW

(71) Applicant: Excalibur IP, LLC, New York, NY (US)

(72) Inventors: Siva Gurumurthy, Santa Clara, CA (US); Hang Su, Sunnyvale, CA (US); Vladimir Ofitserov, Foster City, CA (US)

(73) Assignee: EXCALIBUR IP, LLC, New York, NY (US)

( * ) Notice: Subject to any disclaimer, the term of this patent is extended or adjusted under 35 U.S.C. 154(b) by 0 days.

(21) Appl. No.: 15/288,932

(22) Filed: Oct. 7, 2016

(65) Prior Publication Data

US 2017/0024474 A1   Jan. 26, 2017

Related U.S. Application Data

(63) Continuation of application No. 12/687,596, filed on Jan. 14, 2010, now Pat. No. 9,465,879.

(51) Int. Cl.
*G06F 17/30* (2006.01)

(52) U.S. Cl.
CPC .. *G06F 17/30864* (2013.01); *G06F 17/30011* (2013.01); *G06F 17/3089* (2013.01)

(58) Field of Classification Search
CPC ........... G06F 17/30011; G06F 17/3089; G06F 17/30864
USPC ................................................. 707/705, 711
See application file for complete search history.

(56) References Cited

U.S. PATENT DOCUMENTS

| | | | |
|---|---|---|---|
| 5,903,892 | A | 5/1999 | Hoffert et al. |
| 6,014,663 | A | 1/2000 | Rivette et al. |
| 7,031,968 | B2 | 4/2006 | Kremer et al. |
| 7,162,493 | B2 | 1/2007 | Weiss et al. |
| 8,086,692 | B2 | 12/2011 | Sridhar et al. |
| 8,108,371 | B2 | 1/2012 | Dharmarajan et al. |
| 8,422,982 | B2 | 4/2013 | Baird et al. |
| 8,612,420 | B2 | 12/2013 | Sun et al. |
| 2003/0014415 | A1 | 1/2003 | Weiss et al. |
| 2004/0001106 | A1 | 1/2004 | Deutscher et al. |
| 2004/0205514 | A1 | 10/2004 | Sommerer et al. |
| 2005/0050472 | A1 | 3/2005 | Faseler et al. |
| 2005/0097190 | A1 | 5/2005 | Abdelhak |
| 2005/0114330 | A1 | 5/2005 | Chau |
| 2005/0114784 | A1 | 5/2005 | Spring et al. |

(Continued)

*Primary Examiner* — James Trujillo
*Assistant Examiner* — Jessica N Le
(74) *Attorney, Agent, or Firm* — James J. DeCarlo; Greenberg Traurig, LLP

(57) ABSTRACT

Disclosed herein is use of a preview of content from a target document, as provided by a content preview source such as a Really Simple Syndication (RSS) feed, by a search engine. The content preview source includes the preview of the target document's content and a reference, e.g., a Universal Resource Locator (URL) or other link. A content preview document is generated using data extracted from the content preview source. The content preview document is made available in a searchable index used by a search engine to respond to a search query. A fetch operation is scheduled to fetch the target document using the reference provided in the content preview source. Once fetched, the data extracted from the content preview source can be associated with the target document, and can be used in presenting the target document in search results.

20 Claims, 10 Drawing Sheets

(56) References Cited

U.S. PATENT DOCUMENTS

| | | |
|---|---|---|
| 2006/0155752 A1 | 7/2006 | Hrle et al. |
| 2006/0230021 A1 | 10/2006 | Diab et al. |
| 2006/0294476 A1 | 12/2006 | Buckley |
| 2007/0038718 A1 | 2/2007 | Khoo et al. |
| 2007/0226192 A1 | 9/2007 | Vaca et al. |
| 2007/0244857 A1 | 10/2007 | Yu |
| 2007/0245020 A1 | 10/2007 | Ott, IV |
| 2007/0288514 A1 | 12/2007 | Reitter et al. |
| 2008/0134093 A1 | 6/2008 | Dharmarajan et al. |
| 2008/0147708 A1 | 6/2008 | Read et al. |
| 2008/0235594 A1 | 9/2008 | Bhumkar et al. |
| 2009/0006201 A1 | 1/2009 | Faseler, Jr. |
| 2009/0063561 A1 | 3/2009 | Sayko et al. |
| 2009/0132373 A1 | 5/2009 | Redlich |
| 2009/0150353 A1 | 6/2009 | Laakso et al. |
| 2009/0150769 A1 | 6/2009 | Konnola et al. |
| 2009/0313100 A1 | 12/2009 | Ingleshwar |
| 2009/0319484 A1 | 12/2009 | Golbandi et al. |
| 2009/0327057 A1 | 12/2009 | Redlich |
| 2010/0070523 A1 | 3/2010 | Delgo et al. |
| 2010/0332497 A1 | 12/2010 | Valliani et al. |
| 2011/0055195 A1 | 3/2011 | Reitter et al. |
| 2011/0173569 A1 | 7/2011 | Howes et al. |
| 2011/0219295 A1 | 9/2011 | Adams et al. |
| 2011/0238660 A1 | 9/2011 | Riggs |
| 2012/0017284 A1 | 1/2012 | Kim et al. |

McDonald's, Santa Clara, CA : Reviews and maps - Yahoo! Local
★★★★ (2 Reviews) - (408) 727-9726 - Santa Clara, CA 95054
McDonald's, Santa Clara, CA : Reviews and maps - Yahoo! Local, 408.727.9726. Get Ratings, Reviews, Photos and more on Yahoo! Local.
local.yahoo.com/info-21580828-mcdonald-s-santa-clara - Cached

SEARCH ENGINE RECENCY USING CONTENT PREVIEW

CROSS REFERENCE TO RELATED APPLICATIONS

This applaication is a continuation of and claims priority from co-pending U.S. patent application Ser. No. 12/687,596, filed Jan. 14, 2010, entitled SEARCH ENGINE RECENCY USING CONTENT PREVIEW, which is hereby incorporated by reference.

FIELD OF THE DISCLOSURE

The present disclosure relates to improvements in search engine recency, and more particularly to previewing content prior to a web crawler crawling the content.

BACKGROUND

A search engine answers user queries using an index of documents in its documents database. It follows that in order for a search engine to provide results that are relevant to a query, the search engine's index must have content, or documents, that are relevant to the query.

Typically, index and documents databases are populated using a crawler, or crawlers, and an indexer. A crawler crawls links and fetches content, including web pages, or documents, or other content from a network, such as the internet or web. An indexer creates an index of the fetched documents. To fetch documents, a crawler usually operates on a prioritized list of links corresponding to the documents. The crawler can run continuously, or can run less frequently. An indexer typically runs periodically, such as once a week, and builds an index database. After the indexer builds the index database, the index database can be used by a search engine to identify documents relevant to a search request.

A crawler has a limited capacity, which may delay or limit the links crawled and/or the documents fetched by the crawler. While crawler can prioritize its operation by prioritizing the links that it crawls, this may not be sufficient to ensure that relevant documents are not missed by the crawler. The crawler may not properly prioritize the documents, which can result in less relevant documents being fetched and more relevant good documents being missed or fetched later. Additionally, some sites have policies to block or limit the maximum connections per fetcher, which can result in delays or prohibitions in fetching discovered pages. These problems translate into an increase in delays, or prohibitions, in providing documents for searching, and result in the search engine providing less than satisfactory performance, e.g., results that lack the most relevant documents.

SUMMARY

The present disclosure seeks to address, inter alia, fetching prohibitions, as well as to address inherent delay due at least in part to the process of discovering, fetching and indexing of documents, and further seeks to improve search engine recency. Embodiments of the present disclosure provide content preview extraction, selection and presentation capabilities. By way of a non-limiting example, if a query concerns a recent event, the search engine may not have access to relevant documents about the event. The lack of access to documents, such as documents concerning recent events, can be due to, for example: 1) target documents not being discovered, 2) target pages discovered, but not fetched, 3) target pages fetched, but not indexed, and/or 4) target documents discovered, but cannot be fetched due to a prohibition of the target website. Advantageously, to minimize the inherent delay and to address other problems associated with making a document available to a search engine, a preview of a target document is made available to a search engine, e.g., a content preview document can be made available to the search engine even before the target document is made available to the search engine. In so doing, the content preview document, which can include, for example, content about or from target the document and/or a summary of the target document's content, is made available to the search engine once it is published, so that it can be considered for inclusion in search results prepared in response to a query. In accordance with one or more embodiments, a link to the target document containing the content being previewed can be identified and used to fetch the target document. Once the target document is made available to the search engine, e.g., included in an index used by the search engine, data from the content preview can be used to provide a rich presentation of the target document in search results that reference the target document.

While any content preview source can be used, in accordance with one or more embodiments, one example used herein is a web feed, such as a Really Simple Syndication (RSS) feed. RSS feeds provide frequently published web content, and usually but not necessarily relate to recent events. An RSS feed typically includes a collection of structured items, each item including a link to a target document or page and a preview of the target document or page. An RSS feed item can include other metadata as well. The link can be a uniform resource locator (URL), or other link that identifies the document. The content preview is extracted from the item in the RSS feed and used to create a new document, which is in addition to the target document that is being previewed. The new document can be created independent of fetching and/or indexing the target document. The content preview document generated using information extracted from an item in the content preview source, e.g., the RSS feed, is indexed and made available to the search engine. The content preview document can be made available to the search engine even before the target document is fetched and/or indexed.

Advantageously, embodiments of the disclosure provide improvements to a search system and increase a search index's comprehensiveness by, for example: 1) increasing the speed with which at least a preview of content is added to the search index, and 2) showing a preview of content that might not be accessible to the search system, e.g., a crawler-blocked target document.

Additionally, a source, such as an RSS feed, has additional data, e.g., metadata that can be used to enhance the presentation of the content preview or the target document in search results provided to the user.

Embodiments of the present disclosure provide a mechanism for selecting content preview sources using a trained model. In accordance with one or more embodiments, the selection process selects RSS feeds determined to be of sufficient quality, and content preview(s) contained in a selected RSS feed is/are extracted. In accordance with one or more embodiments, a machine-learning approach, which trains one or more learned models, is used to generate a measure, or measures, of the quality and/or usefulness of a content preview source, e.g., a measure that the content preview source contains content previews that would be of interest to users.

In accordance with one or more embodiments, a method is provided of extracting, by at least one computer, data and a link from a content preview source, the data and the link corresponding to a target document, the target document containing content being previewed by the content preview source; creating, by the at least one computer, a content preview document using the data extracted from the content preview source, the content preview document being different from the target document and the content preview source; and making, by the at least one computer, the created content preview document available for searching by a search engine in an index.

In accordance with one or more embodiments, a search system is provided, which comprises at least one computing device configured to extract data and a link from a content preview source, the data and the link corresponding to a target document, the target document containing content being previewed by the content preview source; create a content preview document using the data extracted from the content preview source, the content preview document being different from the target document and the content preview source; and make the created content preview document available for searching by a search engine in an index.

In accordance with one or more embodiments, a computer-readable storage medium tangibly stores thereon computer-executable process steps, the process steps comprising extracting data and a link from a content preview source, the data and the link corresponding to a target document, the target document containing content being previewed by the content preview source; creating a content preview document using the data extracted from the content preview source, the content preview document being different from the target document and the content preview source; and making the created content preview document available for searching by a search engine in an index.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an exemplary overview of components used in accordance with one or more embodiments of the present disclosure.

FIG. 2 provides an example of components of a crawler in accordance with one or more embodiments of the present disclosure.

FIG. 3 provides an example of components of an indexer in accordance with one or more embodiments of the present disclosure.

FIG. 4 provides an example of components of a model generator and feed monitor/selector in accordance with one or more embodiments of the present disclosure.

FIG. 5 provides an exemplary general process flow overview in accordance with one or more embodiments of the present disclosure.

FIG. 6 provides an exemplary model generation process flow in accordance with one or more embodiments of the present disclosure.

FIG. 7 provides an exemplary content preview source selection process flow in accordance with one or more embodiments of the present disclosure.

FIG. 8 provide an example of a search result item presentation in accordance with one or more embodiments.

DETAILED DESCRIPTION

Figure 1:
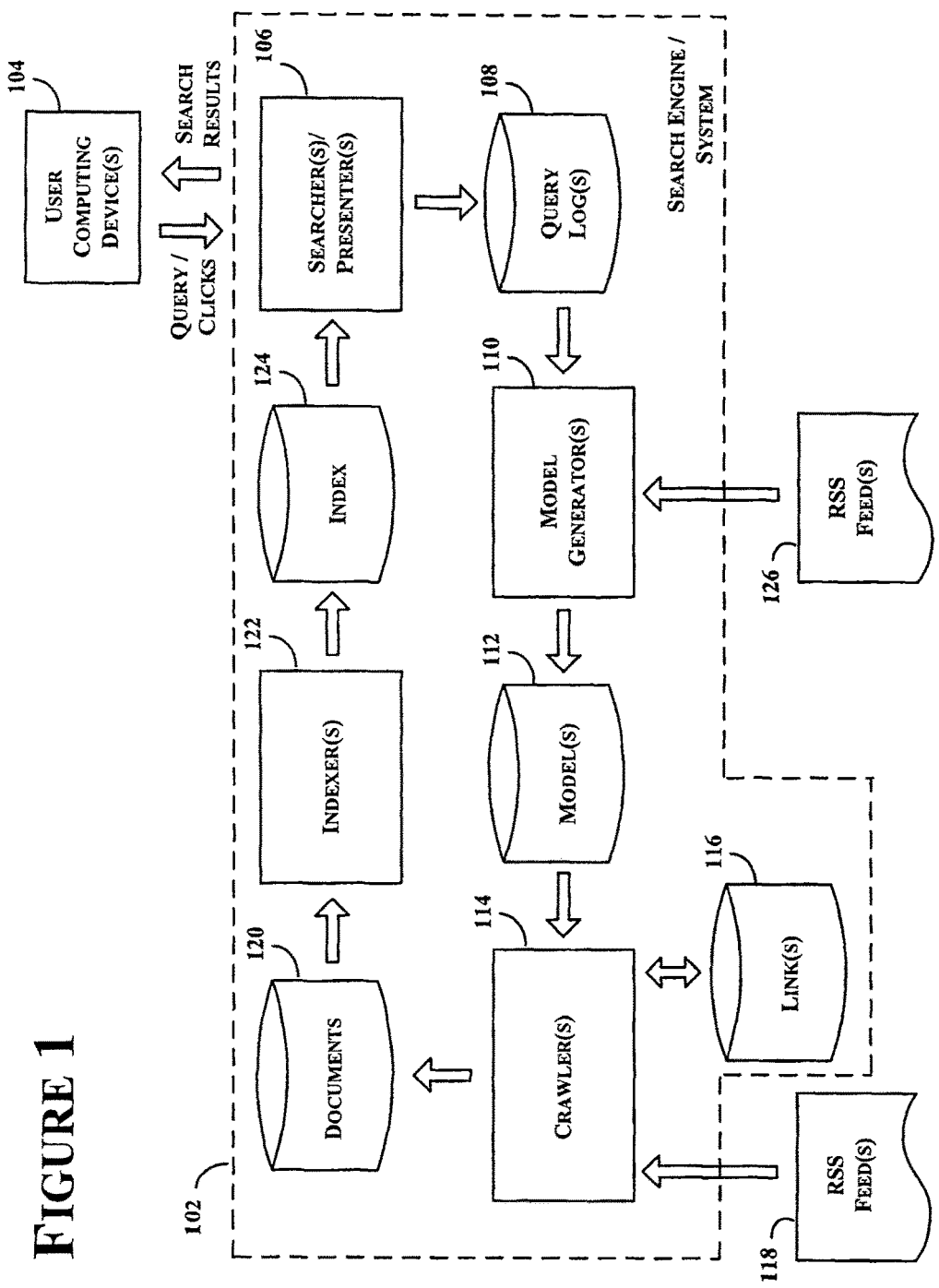

In general, the present disclosure includes a system, method and architecture that use content previews for search engine recency. Embodiments of the present disclosure provide content preview selection, extraction and presentation capabilities.

Certain embodiments of the present disclosure will now be discussed with reference to the aforementioned figures, wherein like reference numerals refer to like components. While functionality provided in accordance with one or more embodiments of the present disclosure is described in connection with specific one or more components, it should be apparent that the functionality need not be provided by the specific one or more component, but can be provided by other, different components. Additionally, it should be apparent that two or more individual components can be combined to form a single component, or a single component can be divided into more than one component. It should also be apparent that additional components not shown in the figures can provide functionality disclosed in connection with embodiments of the present disclosure.

Disclosed herein is use of a preview of content from a target document, as provided by a content preview source such as an RSS feed, by a search engine. The content preview source includes the preview of the target document's content and a reference, e.g., a URL or other link. A content preview document is generated using data extracted from the content preview source. The content preview document is made available in a searchable index used by a search engine to respond to a search query. A fetch operation fetches the target document using the reference provided in the content preview source. In accordance with one or more embodiments, the fetch operation is a parallel process and a content preview can be available even before fetching the corresponding target document. Advantageously, the content preview document generated and indexed for search avoids delays in presenting the corresponding target document in search results, such delays being in discovering, fetching and/or indexing of the target document. Until the target document is fetched, a content preview document generated using data contained in an item of a content preview source, e.g., a web feed such as an RSS feed is available for search. Once the target document is fetched, all, or portions, of the content preview document can be associated with the target document. In accordance with one or more embodiments, portions of the content preview document can be used in presenting the target document in search results.

While any content preview source can be used, in accordance with one or more embodiments, one example of a content preview source used herein is a web feed, such as an RSS feed. RSS feeds provide a mechanism for publishing web content, such as content related to current or recent events. An RSS feed typically includes a collection of structured items, each item including a link to a target document or page and a preview of the target document or page. An RSS feed item can include other metadata as well. The link can be a uniform resource locator (URL), or other link that identifies the document. The content preview is extracted from the item in the RSS feed and used to create a new document, which is in addition to the target document that is being previewed. The new document, the content preview document, can be created independent of fetching and/or indexing the target document. In accordance with one or more embodiments, the content preview document can be created in parallel with fetching the target document. The content preview document generated using information extracted from an item in the content preview source, e.g., the RSS feed, is indexed and made available to the search engine. The content preview document can be made available to the search engine even before the target document is fetched and/or indexed.

Additionally, a source, such as an RSS feed, has additional data, e.g., metadata that can be used to enhance the presentation of the content preview or the target document in search results provided to the user.

Embodiments of the present disclosure provide a mechanism for selecting content preview sources using a trained model. In accordance with one or more embodiments, the selection process selects RSS feeds determined to be of sufficient quality, and content preview(s) contained in a selected RSS feed is/are extracted. In accordance with one or more embodiments, a machine-learning approach, which trains one or more learned models, is used to generate a measure, or measures, of the quality and/or usefulness of a content preview source, e.g., a measure that the content preview source contains content previews that would be of interest to users. In the machine-learning approach, training data, which includes empirical evidence of the quality and/or usefulness of the content previews from a content preview source, is collected.

Feature information, which can include without limitation one or more features determined from user click data, is extracted from the training data for each content preview source, each RSS feed. One or more machine-learned models are trained using the training data, and is/are used to determine a likelihood, or probability, that an RSS feed is trustworthy and/or has quality content preview.

The content preview in accordance with embodiments of the present disclosure increases the likelihood that results about a very recent event are made available the search engine in real time. A content preview selection in accordance with one or more embodiments of the present disclosure can cover recent events comprehensively and increase the chance of appearance of recently-published information. By way of a non-limiting example, results from a query about "Michael Jackson" input shortly after his death could include content about his death. By way of a further non-limiting example, advantageously, a content preview presentation in accordance with one or more embodiments can be used to show results in a rich and distinctive format to draw the user's attention to documents considered to be of particular relevance, relative to the other documents in the set of search results, to the user's query. In so doing, a relevant content preview document that is included in search results but not positioned at the top position in the presentation of the search results, e.g., due to the popularity of older documents about Michael Jackson, can be presented using data from the content preview, e.g., to draw the user's attention to the result item.

FIG. 1 provides an exemplary overview of components used in accordance with one or more embodiments of the present disclosure. Search engine, or search system, 102 comprises a crawler (or crawlers) 114, an indexer (or indexers) 122 and a searcher/presenter (or searchers/presenters) 106. A crawler 114 monitors content preview sources, such as RSS Feed (or RSS Feeds) 118, selects some or all of RSS feeds 118, selects one or more items from a selected RSS feed 118, and creates a content preview document using information from a selected item in the content preview source. In accordance with one or more embodiments, an RSS feed is treated like any other document crawled by the crawler 114 for indexing. The content preview document is stored in documents database 120. The content preview document stored in documents database 120 is indexed, with any other documents in documents database 120, by indexer 122. The resulting index 124 is provided to search/presenter 106. A content preview document identified in index 124 can be selected for inclusion in search results determined in response to a query received from a user computer device 104 by searcher/presenter 106. A content preview document and the corresponding document can be indexed by index 124. Alternatively, once a target document is fetched and indexed, some or all of the corresponding content preview document can be merged, or a relationship, or association, can be created, and information from the content preview document can be used to present the target document in a set of search results presented to a user in response to a query.

Generally, an RSS feed, such as RSS feed 118 and/or RSS feed 126, is a markup document, which comprises tags, each of which has a name and one or more properties. By way of a non-limiting example, an item in the RSS feeds 118 and 126 is annotated with fields, tags or markers. The following provides an example of a format of an item in the RSS feed 118 or 126, which is based on the extensible markup language (XML) format:

```
<item>
    <title>Earth Invaded</title>
    <link>URL, or other location indicator<link>
    <description>The earth was attacked by an invasion fleet from
        halfway across the galaxy; luckily, a fatal miscalculation of
        scale resulted in the entire armada being eaten by a small
        dog.</description>
</item>
```

The link field for the item provides the URL, or location, of the target document. The description typically includes text, e.g., a phrase or sentence, which describes the content. In addition, to title, link and description, other tags can include, without limitation, publication time/date, author's name, image, video, last update time/date, language, copyright, category, globally unique identifier, source feed, enclosure, comments, image-related information, such as URL, width, height, etc. for the feed or item. Some non-limiting examples of categories include news headlines or releases, press releases, job listings, upcoming events, etc. In accordance with one or more embodiments, some or all of the tags from an item in an RSS feed 118 are extracted and stored along with, e.g., as part of, the content preview document, the target document or both, in the search index database 124. If a content preview document, or a target document, is selected by the ranking function to be displayed in results, a rich presentation can be created based on the "known" tags and shown in results, e.g., to capture the attention of the user. If the user clicks on an item in the search results provided by the searcher/presenter 106, the corresponding document is returned. In accordance with one or more embodiments, if the selected search result item is the content preview document, the target document is returned to the user computing device 104 by search engine/system 102. In accordance with one or more embodiments, if the user clicks on the cached result, the content preview document is returned to the user computing device 104 by search engine/system 102 in response.

In accordance with one or more embodiments, the content preview source, e.g., RSS feed 118, can be used to locate or identify the target document. By way of a non-limiting example, in a case that the RSS feed item has a link, such as a URL to a target document, crawler 114 extracts the link and stores the link in a link database 116, so that the referenced content can be fetched by the crawler 114. The crawler 114 prioritizes the links in link database 116, and schedules fetches based on the prioritization. Link database 116 can include links other than those extracted from a content preview source. An RSS feed 116 can contain multiple items. By way of a non-limiting example, if an RSS feed 118 contains ten different items, ten different content preview documents, one for each of the ten different items in the RSS feed 118 are generated. In accordance with one or more embodiments, a content preview documents is generated by an RSS crawl event, when the links for the corresponding target documents are scheduled for fetching.

In accordance with one or more embodiments, each of query log(s) 108 comprises a log of queries received from user computer device(s) 104, search results generated from the queries by searcher/presenter 106 and items in a set of search results selected by a user determined based on input received from user computer device(s) 104. In accordance with one or more embodiments, data from the query log(s) 108 and RSS feed(s) 126 are used by model generator(s) 110 to train models 112. As is described in more detail below, one or more features, or feature sets, can be supplied by a Webmap component, or service, which creates, updates and maintains a web graph. By way of some non-limiting examples, as is described in more detail below, features, or feature sets, provided by the Webmap component can be used by model generator(s) 110 to generate model(s) 112, and by crawler(s) 114 in feed selection. Crawler 114 uses a model 112 to select the RSS feeds 114 to extract the content previews and links and to generate the content preview documents.

Figure 2:
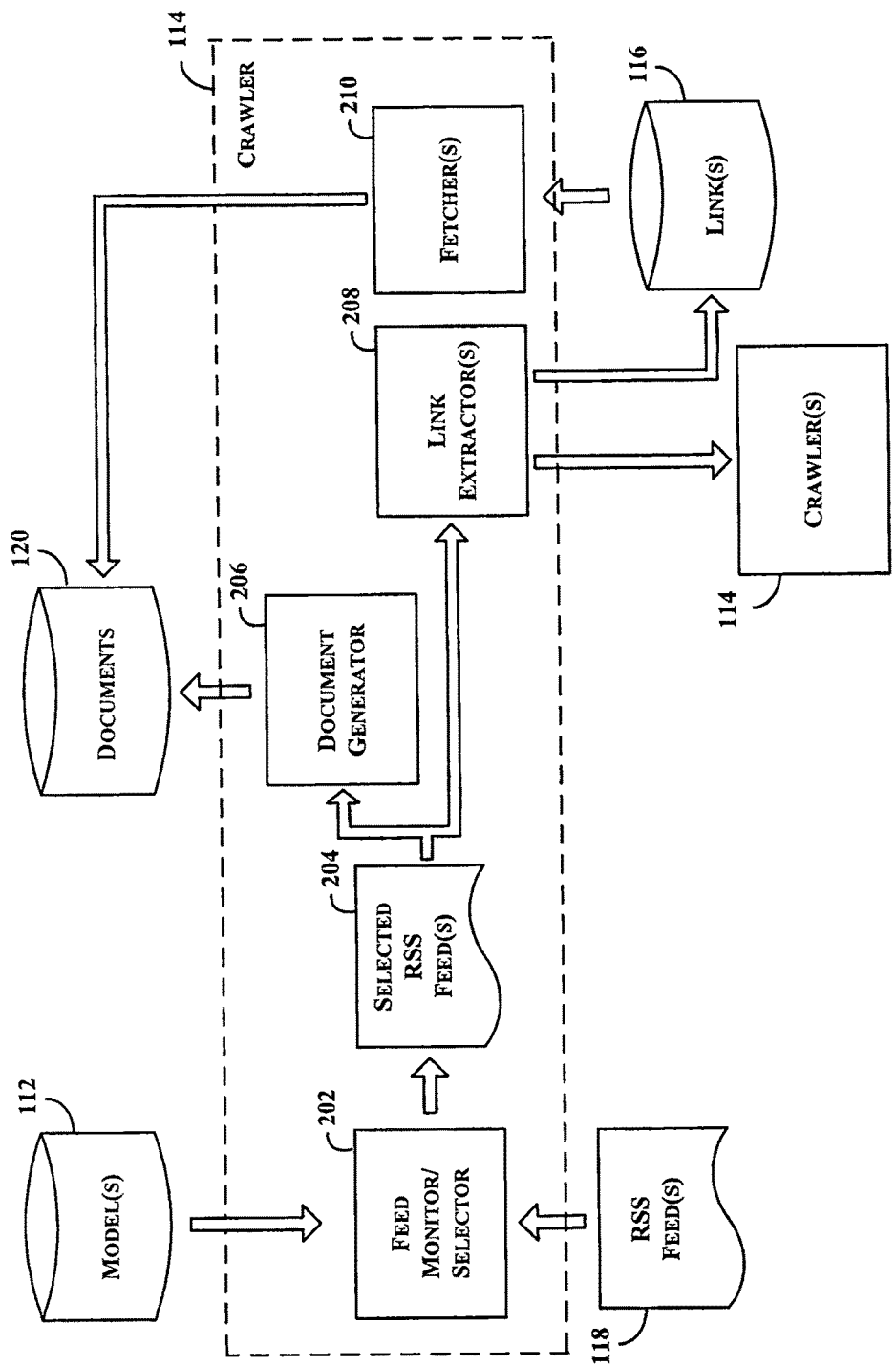

FIG. 2 provides an example of components of a crawler in accordance with one or more embodiments of the present disclosure. In the example shown in FIG. 2, crawler 114 comprises one or more of feed monitor and selector 202, one or more of document generator 206, one or more of link extractor 208 and one or more of fetcher 210.

In accordance with one or more embodiments, feed monitor/selector 202 monitors RSS feeds 118, and selects those RSS feeds 118 that satisfy a threshold level of quality and/or usefulness. In accordance with one or more such embodiments, feed monitor/selector 202 extracts features from an RSS feed 118, and inputs the extracted features to a model 112. Model 112 is used to generate one or more measurements used to determine whether or not to select the RSS feed 118. The features extracted from the RSS feed 118 can be some or all of the features extracted from RSS feeds 126 used to create the model 112. Feed monitor/selector 202 determines examines a measure relative to a threshold for the measure to determine whether or not to select the RSS feed 118. By way of a non-limiting example, model 112 generates a measure of the quality and/or usefulness of the RSS feed 118, and feed monitor/selector 202 examines the quality/usefulness of the RSS feed 118 based on the generated quality/usefulness measure and a quality/usefulness threshold.

An RSS feed 202 selected by feed monitor/selector 202 is input to document generator 206, which generates one or more documents corresponding to one or more items in the selected RSS feed 204 using information contained in the items of the selected RSS feed 204. For example, the document generator 206 can generate a document for each item in the selected RSS feed 204. It is not necessary that document generator 206 create a document from each item in the RSS feed 204, however. Each document generated by document generator 206 is a content preview document, which is stored in documents database 120. A selected RSS feed 204 is forwarded to link extractor 208, which extracts a link to the target document corresponding to the item. Additional links associated with an item, e.g., a link to an image or other content referenced by the item.

Each extracted link is stored in a link database 116 of the crawler 114, or forwarded to another crawler 114, for processing. In accordance with one or more embodiments, a crawler determines whether to store the link in its link database 116 or forward the link to another crawler 114 using a hashed value generated using the link. By way of a non-limiting example, the link comprises a URL, which is normalized and a hash value is generated from the normalized URL. Each crawler 114 has a corresponding range of hash values. An extracted link's hash value, which can be generated by the link extractor 208, is used with the hash value ranges of the crawlers 114 to determine which crawler 114 is to process an extracted link. If the extracted link's hash value indicates that the link is to be processed by another crawler 114, the link extractor 208, or other component of crawler 114, forwards the link to the appropriate crawler 114, as indicated by the extracted link's hash value and the hash value ranges of the crawlers 114. By way of a non-limiting example, the transmitting crawler 114 generates a network packet, such as a User Datagram Protocol (UDP) packet, which contains the URL, anchor text and structured, XML-encoded, data. The receiving crawler 114 receives the packet, decodes the packet, extracts the URL, anchor text and structured data, and adds the URL, with the other data extracted, to its link database 116.

As described in connection with one or more embodiments of the present disclosure, crawler 114 creates a content preview, or synthetic, document using information contained in the link database 116. A fetcher 210 of crawler 114 prioritizes the links in link database 116, schedules fetches using the prioritization, and fetches the documents corresponding to the links using the determined fetching schedule. In accordance with one or more embodiments, fetcher 210 creates a content preview document using the information stored in the link database 116. If available, fetcher 210 fetches a target document, using the link stored in the link database 116. Documents fetched, e.g., created in the case of a content preview document, or fetched in the case of a target document, by fetcher 210 are stored in documents database 120.

Figure 3:
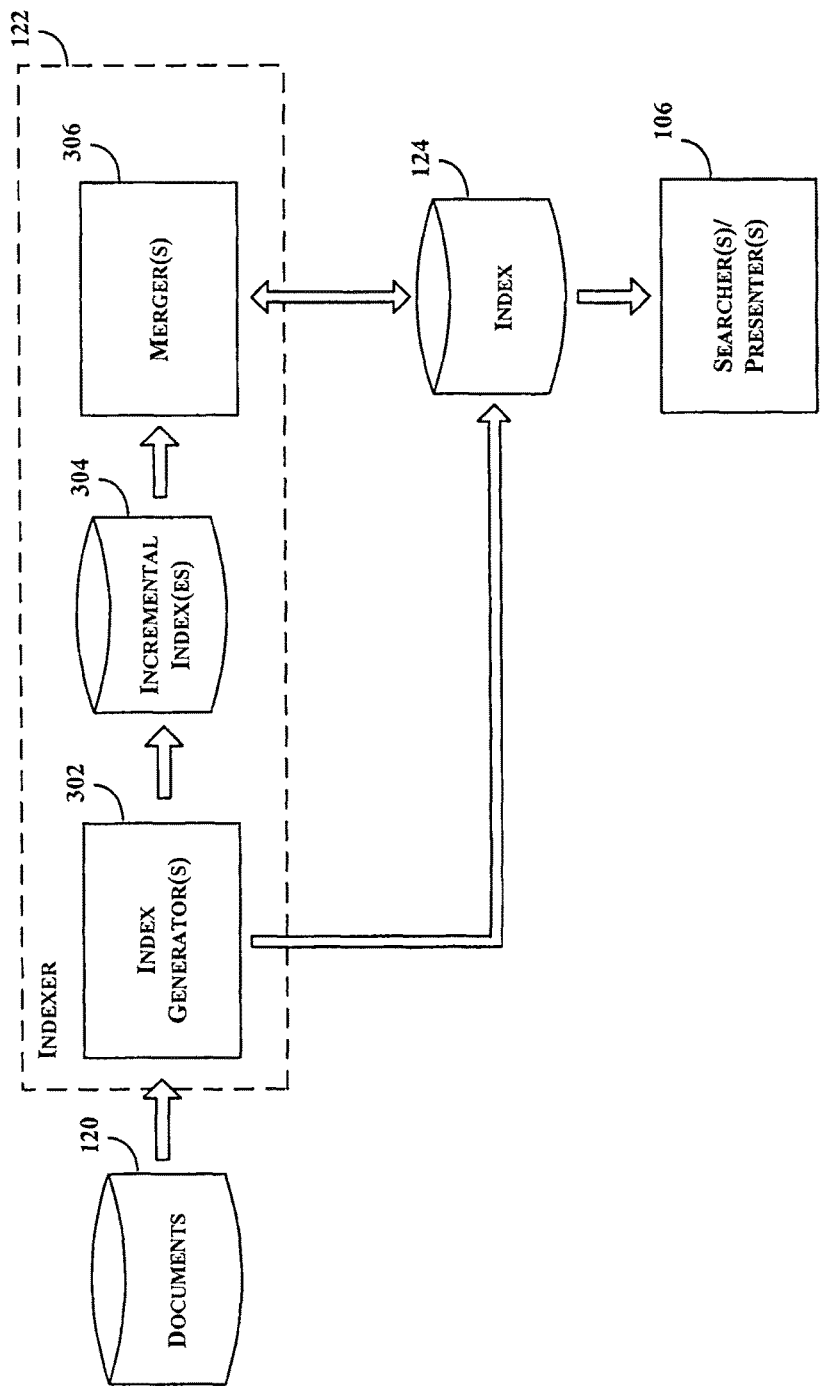

In accordance with one or more embodiments, the documents fetched and stored in documents database 120 are indexed by indexer 122 to generate an index 124. FIG. 3 provides an example of components of an indexer in accordance with one or more embodiments of the present disclosure. While a single indexer 122 is shown, it should be apparent that more than one indexer 122 can be used, e.g., in a distributed manner. In accordance with one or more embodiments, indexer 122 comprises one or more index generators 302, which generate index 124 using documents database 120. Alternatively, index generator 302 creates one or more incremental indexes 304, and merger 306 merges the incremental index 304 and index 124. In accordance with one or more embodiments, index 124 and incremental index 304 are reverse indexes. Index 124 can be used by searcher/presenter 106 to prepare a response to a search request/query. In accordance with one or more embodiments, the response is a set of search results comprising one or more entries, each entry identifying a document from documents database 120. An entry in the set of search results can identify a content preview document created in accordance with one or more embodiments of the present disclosure or a target document.

Figure 4:
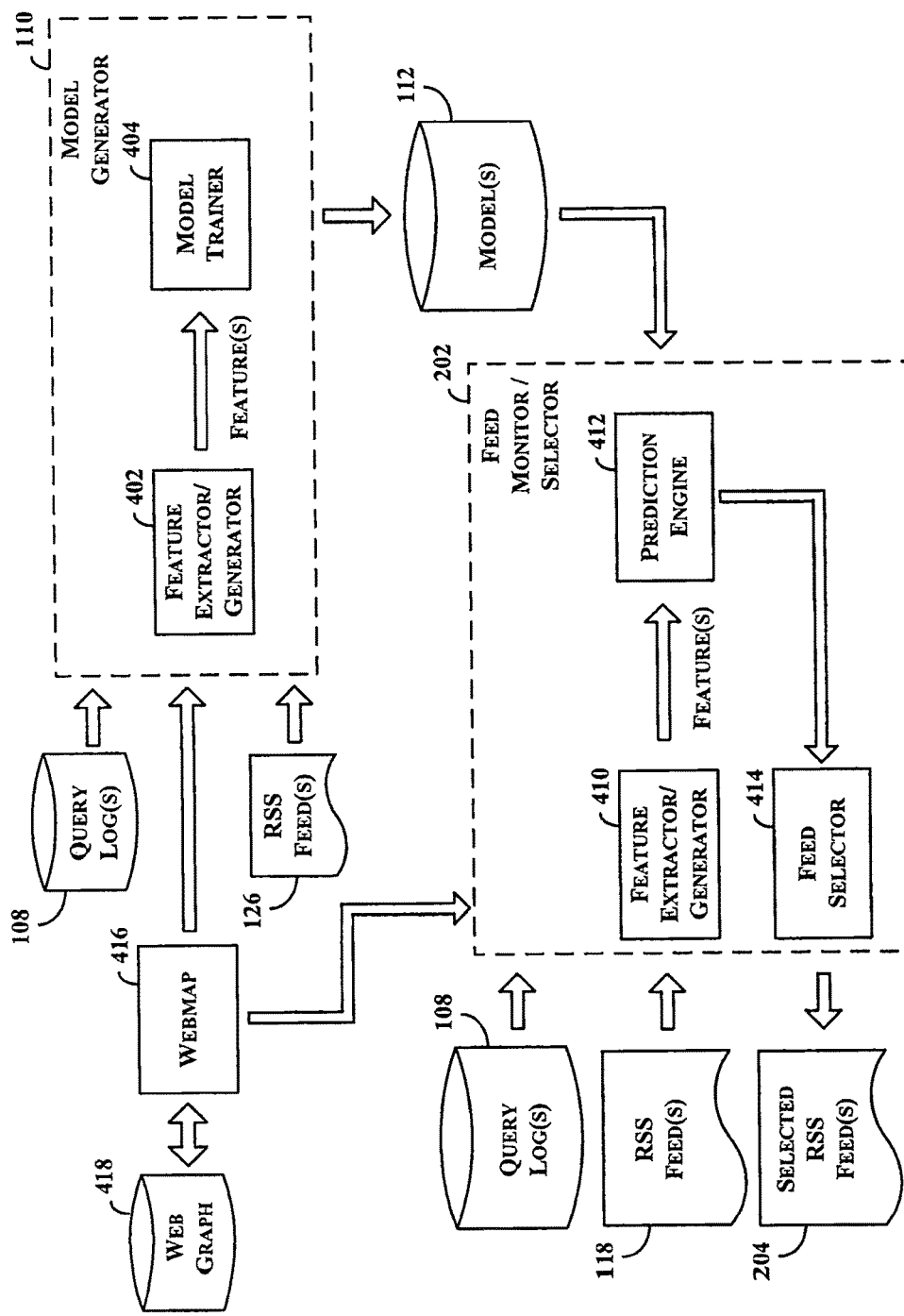

FIG. 4 provides an example of components of a model generator and feed monitor/selector in accordance with one or more embodiments of the present disclosure. In accordance with one or more embodiments, model generator 110 comprises feature extractor/generator 402 and model trainer 404. By way of some non-limiting examples, model trainer 404 can comprise a Naïve Bayes classifier, a logistic regression model generator, etc. Feature extractor/generator 402 extracts features for RSS feed(s) 126 and query log(s) 108. The features are input to model trainer 404, which generates one or more models 112. The following are some non-limiting examples of features extracted by feature extractor/generator 402 10 used by model trainer 404 to generate model 112:

Adult: This feature is an indicator (yes or no) whether the feed is considered to be an adult feed.

Domain Adult: This feature is an indicator (yes or no) whether the domain, e.g., the domain identified in the link is to an adult domain.

Total New Links: This feature is an indicator of a count or total number of new links discovered using the RSS feed during a determined time period, e.g., last month.

Host Quality: This feature is an indicator (yes or no) whether the quality of the host, e.g., the host of the feed, is considered as good.

Total Old Links: This feature is an indicator of a count or total number of old, e.g., known, links in the RSS feed, e.g., a count or total number determined during a time period, such as last month.

Spam: This feature is an indicator (yes or no) whether the feed is considered to be spam.

Domain In-Link: This feature is an indicator of a count or number of back links into the domain.

Badness: This feature is an indicator (yes or no) whether the feed is considered to be bad.

Numurls: This feature is an indicator of a count or number of URLs, or links, in the host of the feed.

Host Trust: This feature is an indicator of a page rank of the host of the feed.

NumClicks: This feature is an indicator of a count or number of user clicks to URLs, or links, discovered using the feed.

NumRevLinks: This feature is an indicator of a count or number of links that point to the feed.

It should be apparent that other features can be used in place of or in addition to the above exemplary features.

In accordance with one or more embodiments, a component or service such as the Webmap 416 creates, updates and maintains a web graph 418, which includes linking relationships between web pages. The web graph 418 is a global snapshot or view of the web at a given time. By way of a non-limiting example, Webmap 416 receives data as input from crawler 114, which the Webmap 416 uses to create the web graph 418. By way of a further non-limiting example, Webmap 416 uses new data from the crawler 114, the existing web graph 418 and the index database 124 to update the web graph 418. Webmap 416 further provides a service that provides a feature set, which can include one or more of the above listed features. By way of a yet another non-limiting example, Webmap 416 can generate, as output, a feature set associated with a feed host using the URL or hostname of the host as input. By way of a further non-limiting example, Webmap 416 can generate, as output, a feature set associated with a web page using the URL of the web page as input.

In accordance with one or more embodiments, Webmap 416 can be used to identify content preview sources, e.g., web feeds such as the RSS feeds. By way of a non-limiting example, Webmap 416 can be used to identify one or more of RSS feeds 118 and/or RSS feeds 126.

In the example shown in FIG. 4, feed monitor/selector 202 comprises feature extractor/generator 410, prediction engine 412 and feed selector 414. In accordance with one or more embodiments, one or more of model(s) 112 is provided to feed monitor/selector 202. An RSS feed 118 and query log(s) 108 are provided to monitor/selector 202. Feature extractor/generator 410 extracts features, such as the features indicated above, from the RSS feed 118 and/or query log(s) 108. In accordance with one or more embodiments, Webmap 416 supplies features to feed monitor/selector 202, e.g., features of RSS feed(s) 118. Prediction engine 412 inputs the extracted features to a model 112 to generate at least one measure of the quality and/or usefulness of the RSS feed 118. By way of a non-limiting example, model 112 provides a measure of clickability, e.g., a predicted likelihood of a page, or pages, identified in the feed being clicked, or selected, by users. In accordance with one or more embodiments, the NumClicks can be a label used to train model(s) 112. In accordance with one or more embodiments, NumClicks can be output by model 112 as a measure, i.e., a clickability measure. By way of a further non-limiting example, model 112 measures a recency measure, e.g., a predicted likelihood that the feed concerns a recent event, or events. Feed selector 414 uses the one or more measures provided by prediction engine 412 to make a determination whether or not to select the RSS feed 118. Selected RSS feed(s) 204 comprise(s) those feeds selected by feed monitor/selector 202 can process by one or more crawlers 114.

In accordance with one or more embodiments, one or more of RSS feed(s) 204 can include RSS feed(s) selected by human judges, e.g., via editorial selection. In accordance with at least one embodiment, the RSS feed(s) selected by human judges can be input as RSS feed(s) 118 for further evaluation by feed monitor/selector 202. In accordance with at least one embodiment, the RSS feed(s) selected by human judges can be included in the selected RSS feed(s) 204, without, i.e., bypassing, evaluation by feed monitor/selector 202. In accordance with at least one embodiment, a portion of the RSS feed(s) selected by the human judges can be input to feed monitor/selector 202 and another portion of the RSS feed(s) selected by the human judges can bypass the feed monitor/selector 202.

Figure 5:
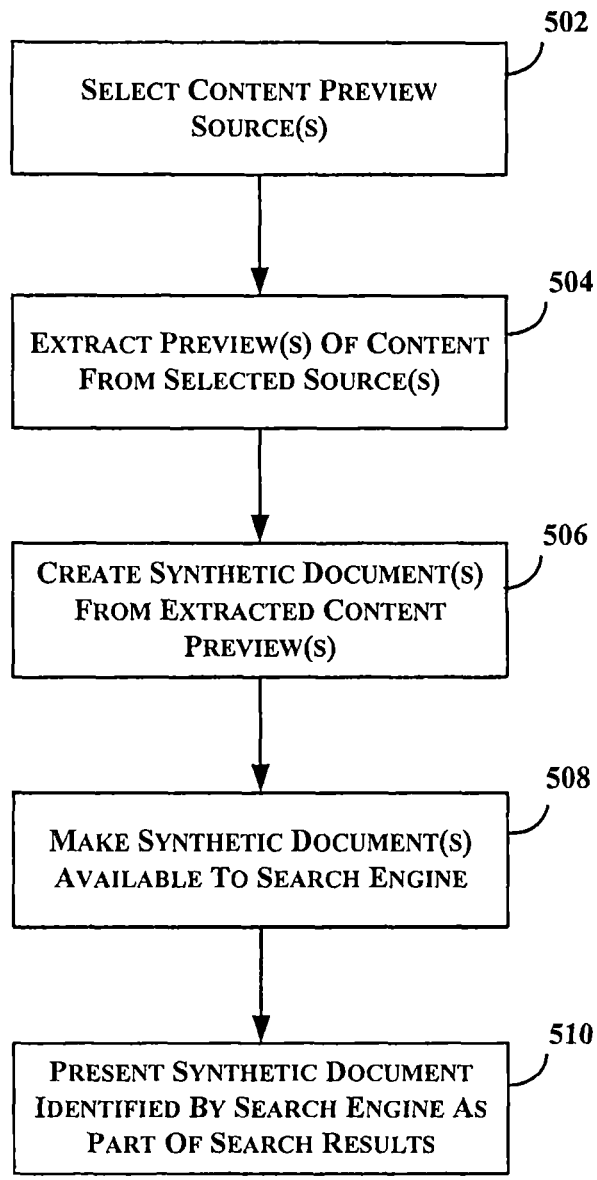

FIG. 5 provides an exemplary general process flow overview in accordance with one or more embodiments of the present disclosure. At step 502, one or more content preview sources is/are selected. As discussed, an RSS feed is one example of a content preview source. At step 504, one or more content previews are extracted from a selected content preview source. In the case of an RSS feed, a content preview corresponds to an item in the RSS feed, and the tags and corresponding data from an item are used to create a content preview document. At step 506, the content preview, or synthetic, document is created using the information extracted from the content preview source, e.g., the information extracted from an item in an RSS feed. At step 508, the content preview document is made available to the search engine/system. At step 510, a content preview document identified by the search engine in response to a search query is provided as part of the set of search results for the search query.

Figure 6:
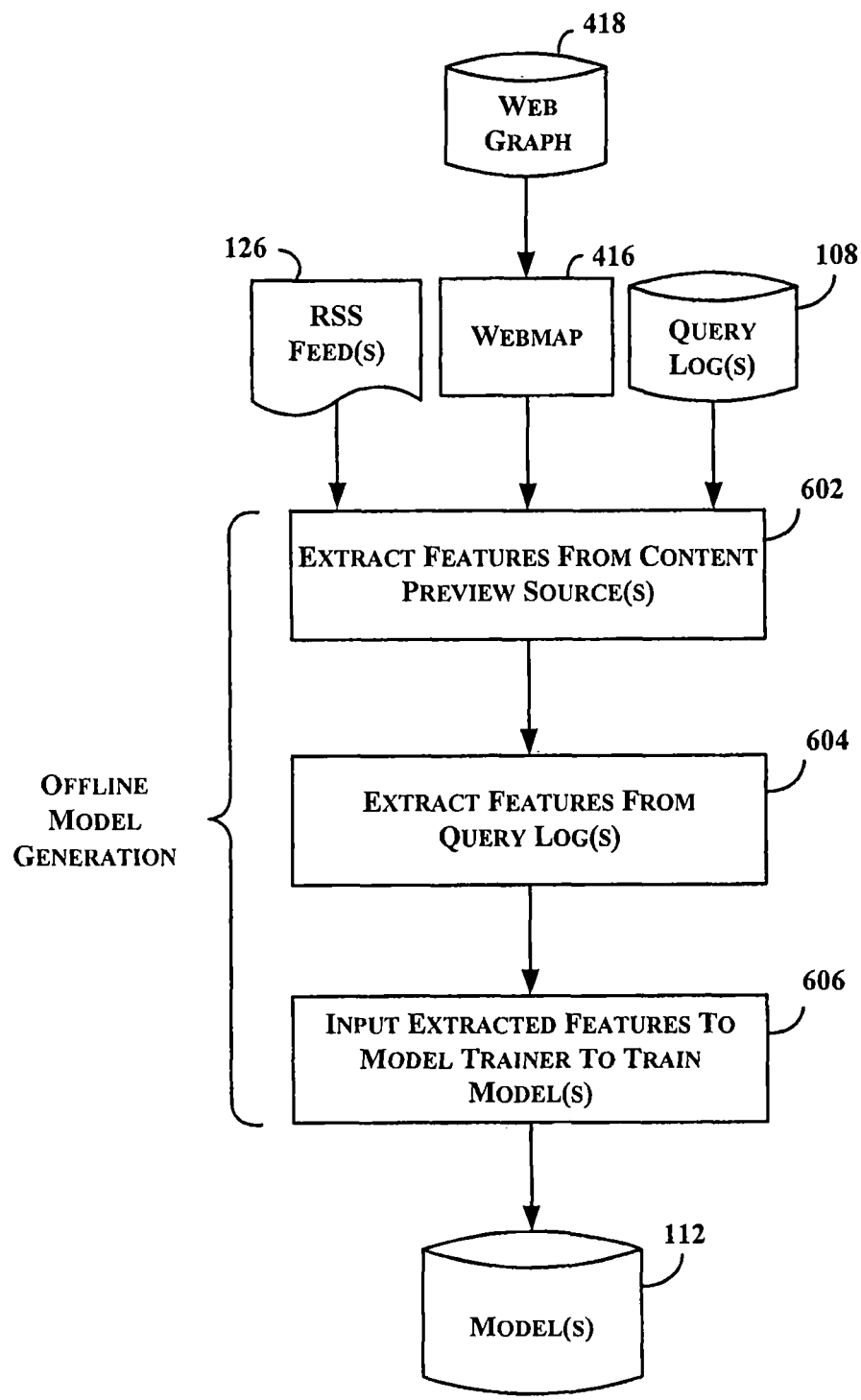

FIG. 6 provides an exemplary model generation process flow in accordance with one or more embodiments of the present disclosure. In the example shown, a content preview source comprises the RSS feed 126. At steps 602 and 604, features are extracted from the RSS feed 126 and query log(s) 108, respectively, By way of a non-limiting example, features extracted from the query log(s) 108 can include features such as the number of user clicks, or selections, of a URL identified in the RS S feed 126, search result ranking, etc. In accordance with one or more embodiments, Webmap service 416 provides features of the RSS feed(s) 126 using web graph 418. At step 606, the extracted features are input to the model trainer to generate one or more models 112.

Figure 7:
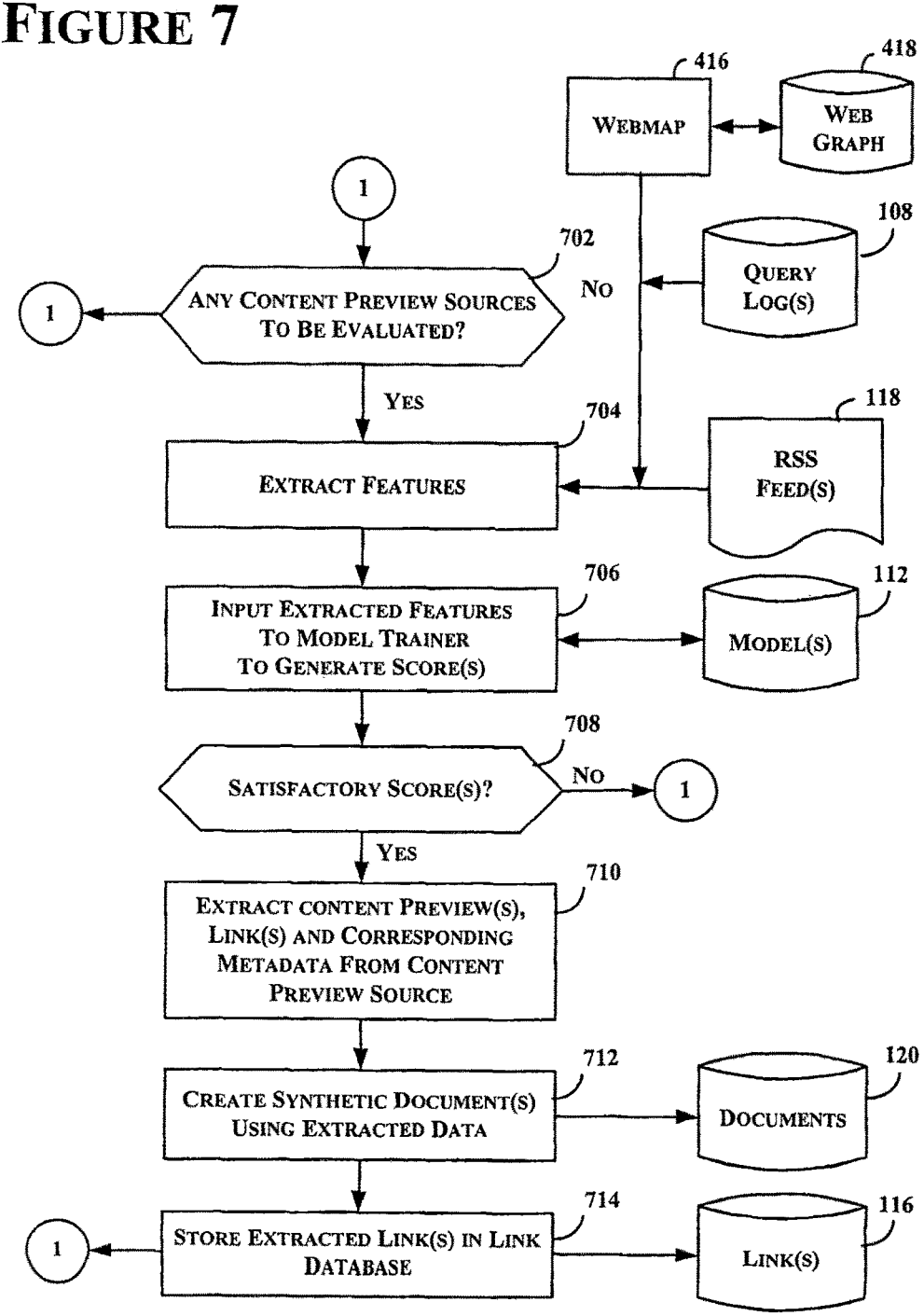

FIG. 7 provides an exemplary content preview source selection process flow in accordance with one or more embodiments of the present disclosure. At step 702, a determination is made whether there are any remaining content preview sources to be evaluated. If so, processing continues at step 704 to extract features corresponding to a content preview source. In the example shown, RSS feed(s) 118 is the content preview source, and features of the RSS feed(s) 118 include those features extracted using query log(s) 108 and the RSS feed(s) 118, as well as those features provided by Webmap 416, which uses web graph 418 to provide the feature(s) or feature set(s). At step 706, the extracted features for the content preview source are input to a model 112 to generate one or more scores or measures for the content preview source. At step 708, a determination is made whether or not the score, or scores, are satisfactory. By way of a non-limiting example, each score, or measure, generated in step 706 can be compared to a threshold to determine whether the score is satisfactory. If it is determined that the score(s), or measure(s), are not satisfactory, processing continues at step 702 to process any remaining content preview sources. If it is determined that the score(s), or measure(s), generated my model 112 in step 706 is/are satisfactory, processing continues at step 710. At step 710, information, e.g., content description/summary, links, other metadata, etc., is extracted from the content preview source. At step 712, one or more content preview documents are created using the information extracted from the content preview source at step 710. The documents are stored in documents database 120, and the extracted links are stored in a link database 116 of one or more crawlers 114, at step 714. Processing continues at step 702 to process any remaining content preview sources.

Figure 8:

FIG. 8 provide an example of a search result item presentation in accordance with one or more embodiments. In the example shown, the search result is annotated with information to provide a rich presentation of the search result item. The search result presentation is annotated with such things as user rating and reviews, an image of the establishment identified in the search result item, etc. By way of another non-limiting example, metadata extracted from a content preview source item, such as comments, publication data, author, etc., can be included to annotate a search result item corresponding to a content preview document or a target document.

In accordance with one or more embodiments, the structured information extracted from an item in an RSS feed, or other content preview source, can be used to select a title and abstract for a document, and the selected title and abstract can be used to present the document in a set of search results. In accordance with one or more embodiments, the structured information extracted from a content preview source, such as an RSS feed, can be used to generate a relevance score for a document, a content preview or target document, which can be used to select or rank the document for a set of search results.

Figure 9:
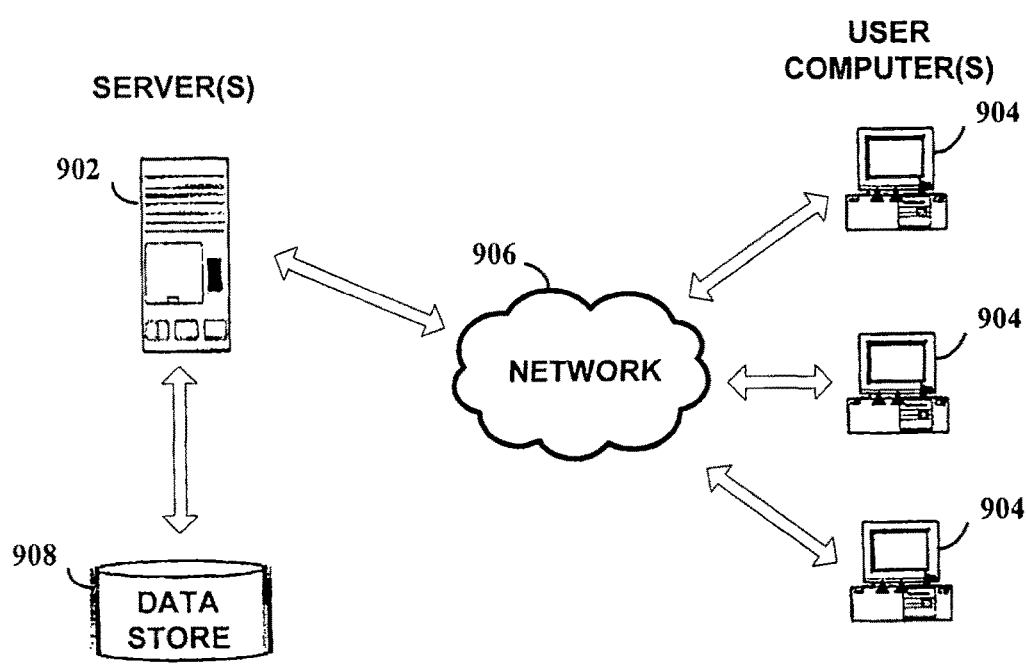
FIG. 9 illustrates some components that can be used in connection with one or more embodiments of the present disclosure.

FIG. 9 illustrates some components that can be used in connection with one or more embodiments of the present disclosure. In accordance with one or more embodiments of the present disclosure, one or more computing devices 902, e.g., one or more servers or other computing device, are configured to comprise functionality described herein. For example, a computing device 902 can be configured as one or more of the components of search engine/system 102 to provide functionality in accordance with one or more embodiments of the present disclosure. Data store 908 can be used to store one or more of documents database 120, index 124, query log(s) 108, model(s) 112, link(s) 116, RSS feed(s) 118, RSS feed(s) 126, RSS feed(s) 204, incremental index(es) 304, etc. Data store 908 can comprise computer-readable media, or medium, that stores computer-executable program code. It should be apparent that there can be more than one search engine/system 102, and/or that one or more search engines 102 can be implemented by the same or a different computing device 902. Additionally, it should be apparent that two or more components of a search engine/system 102 can be implemented by the same or different computing devices 902.

Computing device 902 can serve content to user computers 904, e.g., user computing device 104, using a browser application via a network 906. The user computer 904, and/or user computing device 104, can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 902 and the user computer 904 can include one or more processors, memory, a removable media reader, network interface, display and interface, and one or more input devices, e.g., keyboard, keypad, mouse, etc. and input device interface, for example. One skilled in the art will recognize that server 902 and user computer 904 can be configured in many different ways, and can be implemented using many different combinations of hardware, software, or firmware.

In accordance with one or more embodiments, a computing device 902 can make a user interface available to a user computer 904 via the network 906. The user interface made available to the user computer 904 can be used to present, or provide for display, search results selected by search engine/system 102, which results can identify a content preview document created in accordance with one or more embodiments of the present disclosure. The user interface can be used to receive user input, e.g., selection of a search result item, and provide a document, e.g., a content preview document, in response to a user selection.

In accordance with one or more embodiments, computing device 902 makes a user interface available to a user computer 904 by communicating a definition of the user interface to the user computer 904 via the network 906. The user interface definition can be specified using any of a number of languages, including without limitation a markup language such as Hypertext Markup Language, scripts, applets and the like. The user interface definition can be processed by an application executing on the user computer 904, such as a browser application, to output the user interface on a display coupled, e.g., a display directly or indirectly connected, to the user computer 904.

In an embodiment the network 906 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 9. Alternatively, embodiments of the present disclosure can be implemented other environments, e.g., a peer-to-peer environment as one non-limiting example.

Figure 10:
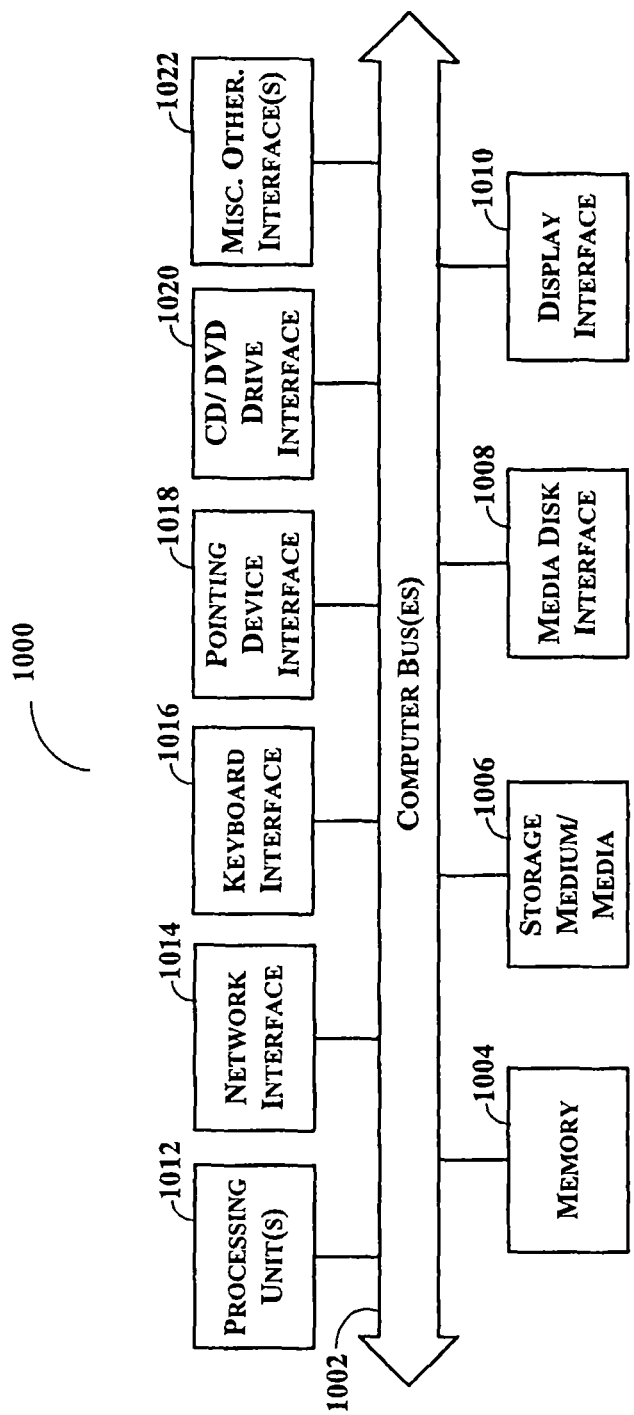
FIG. 10 is a detailed block diagram illustrating an internal architecture of a computing device in accordance with one or more embodiments of the present disclosure.

FIG. 10 is a detailed block diagram illustrating an internal architecture of a computing device, e.g., a computing device such as server 902 or user computer 904, in accordance with one or more embodiments of the present disclosure. As shown in FIG. 10, internal architecture 1000 includes one or more processing units, processors, or processing cores, (also referred to herein as CPUs) 1012, which interface with at least one computer bus 1002. Also interfacing with computer bus 1002 are computer-readable medium, or media, 1006, network interface 1014, memory 1004, e.g., random access memory (RAM), run-time transient memory, read only memory (ROM), etc., media disk drive interface 1008 as an interface for a drive that can read and/or write to media including removable media such as floppy, CD-ROM, DVD, etc. media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code, and/or computer-executable process steps, incorporating functionality described herein, e.g., one or more of process flows described herein. CPU 1012 first loads computer-executable process steps from storage, e.g., memory 1004, computer-readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code executable by a computer, in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
receiving, by a computing device, crawling data from a crawler crawling a content preview source, the content preview source comprising data and a link to a target document;
determining, by the computing device, a plurality of features for the content preview source;
determining, by the computing device, a measure of quality in connection with the content preview source using a quality measurement statistical model and the plurality of features determined for the content preview source;
making, by the computing device and using the determined measure of quality, a determination to create a content preview document, the determination to create the content preview document comprising comparing the measure of quality to a quality threshold to determine that the determined measure of quality exceeds the quality threshold;
creating, by the computing device in connection with crawling the content preview source, a content preview document in response to the determination that the determined measure of quality exceeds the quality threshold, creation of the content preview document performed by the computing device in connection with crawling the content preview source comprising:
extracting, from the content preview source, the data and the link to the target document; and
creating, using the data extracted from the content preview source and without using the target document, the content preview document, the created content preview document is different from the target document;
making, by the computing device and in response to the determination that the determined measure of quality exceeds the quality threshold, the created content preview document available for searching by a search engine in an index prior to the target document being made available for searching by the search engine in the index.

2. The method of claim 1, the measure of quality being determined using the statistical model and comprising a recency measure indicating a predicted likelihood that the content preview source concerns a recent event.

3. The method of claim 1, the measure of quality being determined using the statistical model and comprising a clickability measure indicating a predicted number of clicks.

4. The method of claim 1, the measure of quality being determined using the statistical model and comprising a recency measure indicating a predicted likelihood that the content preview source concerns a recent event and a clickability measure indicating a predicted number of clicks.

5. The method of claim 4, the determination to create the content preview document being made using the determined measure of quality and input indicating selection of the content preview source by a number of human judges.

6. The method of claim 1, the content preview source is a Really Simple Syndication (RSS) feed comprising a preview of the target document's content and a link to the target document.

7. The method of claim 1, further comprising
receiving, by the computing device, a search query;
including, by the computing device in response to the received search query, the content preview document in a set of search results for the search query, inclusion of the content preview document in the set of search results for the search query comprising using the search engine to search the index indexing the content preview document.

8. The method of claim 1, the plurality of features comprising a number of features about a domain of the content preview source.

9. The method of claim 1, the plurality of features comprising a number of features about a host of the content preview source.

10. The method of claim 1, the plurality of features comprising an indicator of whether or not the content preview source is spam.

11. The method of claim 1, the plurality of features comprising a count of user clicks determined using query logs.

12. The method of claim 1, the plurality of features comprising a web page linkage information identified using a web graph comprising linking relationships between web pages.

13. A non-transitory computer readable storage medium tangibly encoded with computer-executable instructions that when executed by a processor associated with a computing device perform a method comprising:
receiving crawling data from a crawler crawling a content preview source, the content preview source comprising data and a link to a target document;
determining a plurality of features for the content preview source;
determining a measure of quality in connection with the content preview source using a quality measurement statistical model and the plurality of features determined for the content preview source;
making, using the determined measure of quality, a determination to create a content preview document, the determination to create the content preview document comprising comparing the measure of quality to a quality threshold to determine that the determined measure of quality exceeds the quality threshold;
creating, in connection with crawling the content preview source, a content preview document in response to the determination that the determined measure of quality exceeds the quality threshold, creation of the content preview document performed in connection with crawling the content preview source comprising:
extracting, from the content preview source, the data and the link to the target document; and
creating, using the data extracted from the content preview source and without using the target document, the content preview document, the created content preview document is different from the target document;
making, in response to the determination that the determined measure of quality exceeds the quality threshold, the created content preview document available for searching by a search engine in an index prior to the target document being made available for searching by the search engine in the index.

14. The non-transitory computer-readable storage medium of claim 13, the measure of quality being determined using the statistical model and comprising a recency measure indicating a predicted likelihood that the content preview source concerns a recent event.

15. The non-transitory computer-readable storage medium of claim 13, the measure of quality being determined using the statistical model and comprising a clickability measure indicating a predicted number of clicks.

16. The non-transitory computer-readable storage medium of claim 13, the measure of quality being determined using the statistical model and comprising a recency measure indicating a predicted likelihood that the content preview source concerns a recent event and a clickability measure indicating a predicted number of clicks.

17. The non-transitory computer-readable storage medium of claim 13, the determination to create the content preview document being made using the determined measure of quality and input indicating selection of the content preview source by a number of human judges.

18. The non-transitory computer-readable storage medium of claim 13, the content preview source is a Really Simple Syndication (RSS) feed comprising a preview of the target document's content and a link to the target document.

19. The non-transitory computer-readable storage medium of claim 13, further comprising:
receiving a search query;
including, in response to the received search query, the content preview document in a set of search results for the search query, inclusion of the content preview document in the set of search results for the search query comprising using the search engine to search the index indexing the content preview document.

20. A computing device comprising:
a processor; and
a non-transitory storage medium for tangibly storing thereon program logic for execution by the processor, the program logic comprising:
receiving logic executed by the processor for receiving crawling data from a crawler crawling a content preview source, the content preview source comprising data and a link to a target document;
determining logic executed by the processor for determining a plurality of features for the content preview source;
determining logic executed by the processor for determining a measure of quality in connection with the content preview source using a quality measurement statistical model and the plurality of features determined for the content preview source;
making logic executed by the processor for making, using the determined measure of quality, a determination to create a content preview document, the determination to create the content preview document comprising comparing the measure of quality to a quality threshold to determine that the determined measure of quality exceeds the quality threshold;
creating logic executed by the processor for creating, in connection with crawling the content preview source, a content preview document in response to the determination that the determined measure of quality exceeds the quality threshold, creation of the content preview document performed in connection with crawling the content preview source comprising:
extracting logic executed by the processor for extracting, from the content preview source, the data and the link to the target document; and
creating logic executed by the processor for creating, using the data extracted from the content preview source and without using the target document, the content preview document, the created content preview document is different from the target document;
making logic executed by the processor for making, in response to the determination that the determined measure of quality exceeds the quality threshold, the created content preview document available for searching by a search engine in an index prior to the target document being made available for searching by the search engine in the index.

* * * * *